(12) United States Patent
Kriminger et al.

(10) Patent No.: US 11,586,280 B2
(45) Date of Patent: Feb. 21, 2023

(54) HEAD MOTION PREDICTION FOR SPATIAL AUDIO APPLICATIONS

(71) Applicant: Apple Inc., Cupertino, CA (US)

(72) Inventors: Evan G. Kriminger, San Francisco, CA (US); Xiaoyuan Tu, Sunnyvale, CA (US); Alexander Singh Alvarado, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/351,187

(22) Filed: Jun. 17, 2021

(65) Prior Publication Data

US 2021/0397249 A1 Dec. 23, 2021

Related U.S. Application Data

(60) Provisional application No. 63/041,813, filed on Jun. 19, 2020.

(51) Int. Cl.
*G06F 3/01* (2006.01)
*H04S 7/00* (2006.01)
*G01P 15/18* (2013.01)

(52) U.S. Cl.
CPC .............. *G06F 3/012* (2013.01); *G01P 15/18* (2013.01); *H04S 7/304* (2013.01)

(58) Field of Classification Search
CPC . G06F 3/012; G06F 3/01; G06F 3/011; H04S 7/00; G01P 15/18
USPC ........................................ 381/310, 367, 370
See application file for complete search history.

(56) References Cited

U.S. PATENT DOCUMENTS

| | | |
|---|---|---|
| 9,459,692 B1 | 10/2016 | Li |
| 10,339,078 B2 | 7/2019 | Nair et al. |
| 2005/0281410 A1 | 12/2005 | Grosvenor et al. |
| 2014/0153751 A1* | 6/2014 | Wells ............... H04S 7/304 381/74 |
| 2016/0119731 A1 | 4/2016 | Lester, III |
| 2016/0269849 A1 | 9/2016 | Riggs et al. |
| 2017/0295446 A1* | 10/2017 | Thagadur Shivappa ............... H04S 7/304 |
| 2018/0091923 A1 | 3/2018 | Satongar et al. |
| 2018/0220253 A1 | 8/2018 | Kärkkäinen et al. |
| 2019/0313201 A1 | 10/2019 | Torres et al. |
| 2019/0379995 A1 | 12/2019 | Lee et al. |
| 2020/0037097 A1 | 1/2020 | Torres et al. |
| 2020/0059749 A1 | 2/2020 | Casimiro Ericsson et al. |
| 2020/0169828 A1 | 5/2020 | Liu et al. |
| 2021/0211825 A1 | 7/2021 | Joyner et al. |
| 2021/0396779 A1 | 12/2021 | Sarathy et al. |
| 2021/0397250 A1 | 12/2021 | Akgul et al. |
| 2021/0400414 A1 | 12/2021 | Tu et al. |

(Continued)

*Primary Examiner* — Yosef K Laekemariam
(74) *Attorney, Agent, or Firm* — Fish & Richardson P.C.

(57) ABSTRACT

Embodiments are disclosed for head motion prediction for spatial audio applications. In an embodiment, a method comprises: obtaining motion data from a source device and a headset; obtaining transmission delays from a wireless stack of the source; estimating relative motion from the relative source device and headset motion data; calculating a first derivative of the relative motion data; forward predicting the estimated relative motion over the time delays using the first derivative and second derivative of relative motion; determining, using a head tracker, a head pose of the user based on the forward predicted relative motion data; and rendering, using the head pose, spatial audio for playback on the headset.

20 Claims, 9 Drawing Sheets

(56) References Cited

U.S. PATENT DOCUMENTS

2021/0400418 A1  12/2021  Tam et al.
2021/0400419 A1  12/2021  Turgut et al.
2021/0400420 A1  12/2021  Tam et al.
2022/0103964 A1   3/2022  Tu et al.
2022/0103965 A1   3/2022  Tu et al.

\* cited by examiner

HEAD MOTION PREDICTION FOR SPATIAL AUDIO APPLICATIONS

CROSS-REFERENCE TO RELATED APPLICATION

This application claims priority to U.S. Provisional Patent Application No. 63/041,813, filed Jun. 19, 2020, the entire contents of which are incorporated herein by reference.

TECHNICAL FIELD

This disclosure relates generally to spatial audio applications.

BACKGROUND

Spatial audio creates a three-dimensional (3D) virtual auditory space that allows a user wearing a headset to pinpoint where a sound source is located in the 3D virtual auditory space, while watching a movie, playing a video game or interacting with augmented reality (AR) content on a source device (e.g., a computer screen). Existing spatial audio platforms include a head pose tracker that uses a video camera to track the head pose of a user. If the source device is a mobile device (e.g., smartphone, tablet computer), then the source device and the headset are free to move relative to each other, which may adversely impact the user's perception of the 3D spatial audio.

SUMMARY

Embodiments are disclosed for head motion prediction for spatial audio applications.

In an embodiment, a method comprises: obtaining, using one or more processors, motion data from a source device and a headset; obtaining, using the one or more processors, transmission delays; estimating, using the one or more processors, relative motion from the relative source device and headset motion data; calculating, using the one or more processors, a first derivative of the relative motion data; calculating, using the one or more processors, a second derivative of the filtered relative motion data; forward predicting, using the one or more processors, the estimated relative motion over the time delays using the first derivative and second derivative of relative motion; determining, using a head tracker, a head pose of the user based on the forward predicted relative motion data; and rendering, using the one or more processors and the head pose, spatial audio for playback on the headset.

In an embodiment, rendering, using the one or more processors and the head pose, spatial audio for playback on the headset comprises: rendering audio channels in an ambience bed of a three-dimensional virtual auditory space, such that a center channel of the audio channels is aligned with a boresight vector that originates from a headset reference frame and terminates at a source device reference frame, wherein the center channel is aligned with boresight vector by rotating a reference frame for the ambience bed to align the center channel with boresight vector, and wherein the boresight indicates a relative position between the source device and the headset.

In an embodiment, the motion data is obtained over a Bluetooth™ communication channel between the headset and the source device.

In an embodiment, the source device is a mobile device are configured to present visual content synchronized with spatial audio played through the headset.

In an embodiment, the time delays includes a return delay from the source device to the headset that is measured by a wireless communication stack on the headset and sent back to the source device with the headset motion data.

In an embodiment, time delays include a first time delay to decode packets carrying the motion data and a second time delay to access and read buffers storing the motion data.

In an embodiment, the return delay is predicted or estimated based on an average of return time delays that are accumulated by at least one of the headset or the source device.

In an embodiment, the method further comprises filtering, using the one or more processors, the first derivative of the relative motion data to remove outlier data.

In an embodiment, the filtering includes filtering using a median filter.

In an embodiment, the motion data includes relative position data and rotation data, the first derivative of the relative position is relative velocity, the first derivative of the rotation data is rotation rate, the second derivative of relative velocity is relative acceleration and the second derivative of rotation rate is rotational acceleration.

In an embodiment, a system comprises: one or more processors; memory storing instructions that when executed by the one or more processors, cause the one or more processors to perform operations comprising: obtaining motion data from a source device and a headset; obtaining transmission delays from a wireless stack of the source; estimating relative motion from the relative source device and headset motion data; calculating a first derivative of the relative motion data; calculating a second derivative of the filtered relative motion data; forward predicting the estimated relative motion over the time delays using the first derivative and second derivative of relative motion; determining, using a head tracker, a head pose of the user based on the forward predicted relative motion data; and rendering, using the head pose, spatial audio for playback on the headset.

Other embodiments can include an apparatus, computing device and non-transitory, computer-readable storage medium.

Particular embodiments disclosed herein provide one or more of the following advantages. The relative motion (e.g., relative position and attitude) between a source device and a headset is tracked using motion data from both the source device and the headset to allow a 3D virtual auditory space to be centered on a reference boresight vector, so that the user perceives audio originating from a center channel of the virtual auditory space to always come from the source device regardless of the posture of the user or the source device. The relative motion is predicted forward in time before rendering the spatial audio to address a first delay incurred when sending the headset motion data to the source device over a wireless communication channel, and address a second delay incurred when sending the rendered spatial audio back to the headset for playback.

The details of one or more implementations of the subject matter are set forth in the accompanying drawings and the description below. Other features, aspects and advantages of the subject matter will become apparent from the description, the drawings and the claims.

DETAILED DESCRIPTION

Example Systems

Figure 1:
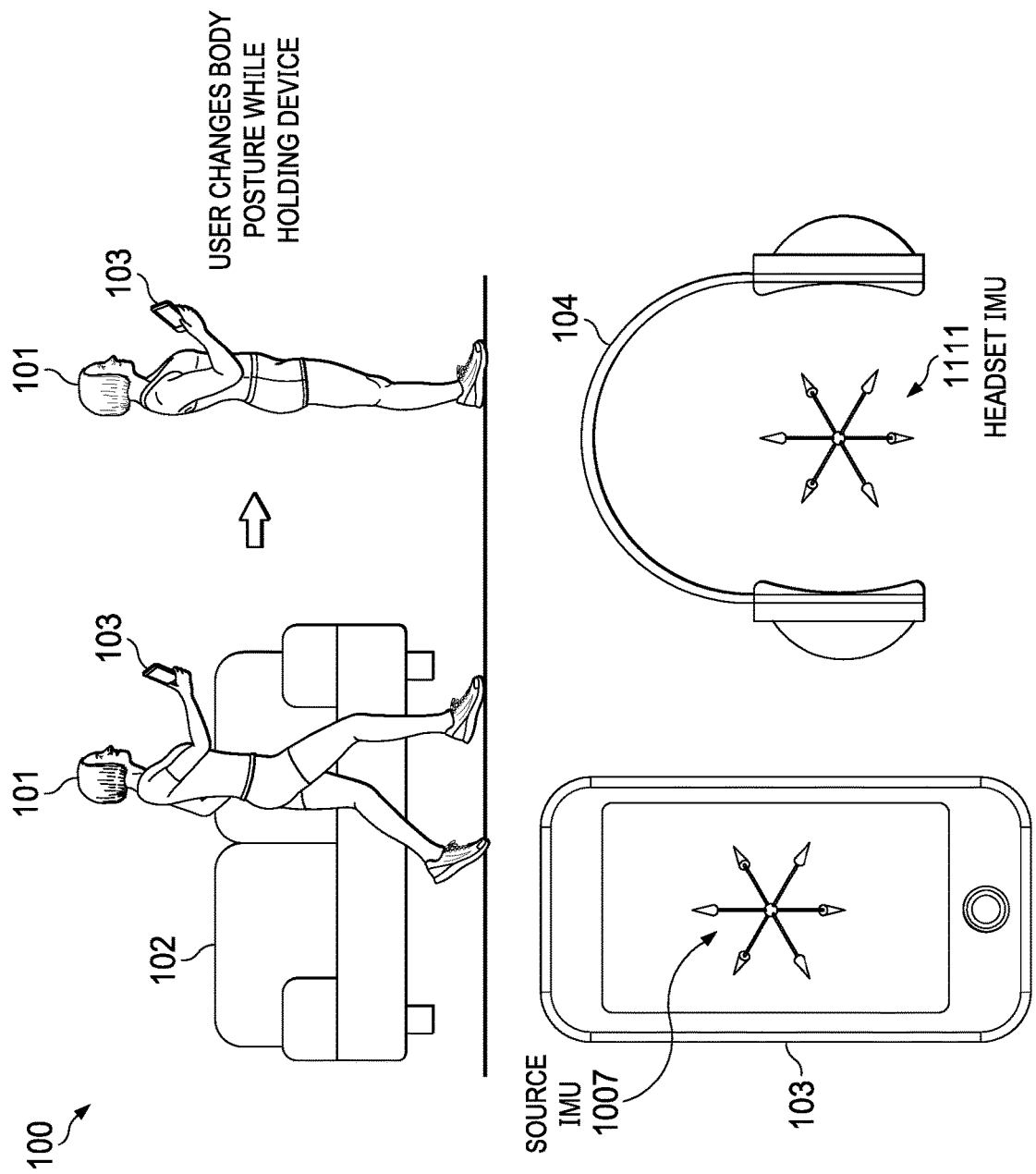
FIG. 1 illustrates an example user posture change event, according to an embodiment.

FIG. 1 illustrates an example user posture change event, according to an embodiment. In the example shown, user 101 is viewing a visual portion of AV content displayed on source device 103 while sitting on couch 102. User 101 is wearing a headset 104 that is wirelessly coupled to source device 103. Headset 104 includes stereo loudspeakers that output rendered spatial audio (e.g., binaural rendered audio) content generated by source device 103. A user posture change event occurs when user 101 stands up from a seated position on couch 102 and begins walking with source device 103 in her hands while still viewing the content displayed on source device 103.

In the examples that follow, source device 103 includes any device capable of playing AV content and can be wired or wirelessly coupled to headset 104, including but not limited to a smartphone, tablet computer, laptop computer, wearable computer, game console, television, etc. In an embodiment, source device 103 includes the architecture 600 described in reference to FIG. 6. The architecture 600 includes inertial measurement unit (IMU) 607 that includes various motion sensors, including but not limited to angular rate sensors (e.g., 3-axis MEMS gyro) and accelerometers (e.g., 3-axis MEMS accelerometer). When source device 103 is moved or rotated, the motion sensors detect the motion. The outputs of IMU 607 are processed into rotation and acceleration data in an inertial reference frame. In an embodiment, source device 103 outputs AV content, including but not limited to augmented reality (AR), virtual reality (VR) and immersive video content. Source device 103 also includes an audio rendering engine (e.g., a binaural rendering engine) that simulates the main audio cues humans use to localize sounds including interaural time differences, interaural level differences, and spectral filtering done by the outer ears.

Headset 104 is any device that includes loudspeakers for projecting acoustic audio, including but not limited to: headsets, earbuds, ear phones and loudspeakers (e.g., smart speakers). In an embodiment, headset 104 includes the architecture 700 described in reference to FIG. 7. The architecture includes IMU 711 which includes various motion sensors, including but not limited to angular rate sensors (e.g., 3-axis MEMS gyro) and accelerometers (e.g., 3-axis MEMS accelerometer). When user 101 translates or rotates her head, the motion sensors in IMU 711 detect the motion. The outputs of the headset motion sensors are processed into rotation and acceleration data in the same inertial reference frame as the rotation and acceleration output by IMU 607 of source device 103.

Two ensure that the spatial audio remains "centered," an estimated relative motion (relative position and attitude) is determined using motion data from IMU 607 and IMU 711, as described in Appendix A. The estimated relative pose is used by a head tracker to keep track of the user's head pose. The relative pose will incur error over time that needs to be corrected periodically or based on a trigger event, such as a user posture change. The motion data from IMU 711 is transferred to source device 103 over a wireless communication channel (e.g., a Bluetooth channel). This transfer incurs a delay, such that the estimated relative position vector will not be in sync with the motion data from IMU 711. Additionally, the rendered audio that is sent back from source device 103 to headset 104 will incur a return delay, such that the rendered audio will be out of sync with the estimated relative motion. If the total latency exceeds 50 milliseconds the latency will be perceived by the user. As described below in reference to FIGS. 3-5, this latency is addressed by predicting forward the relative motion by the amount of the latency before sending it back to headset 104 for playback to user 101.

Figure 2:
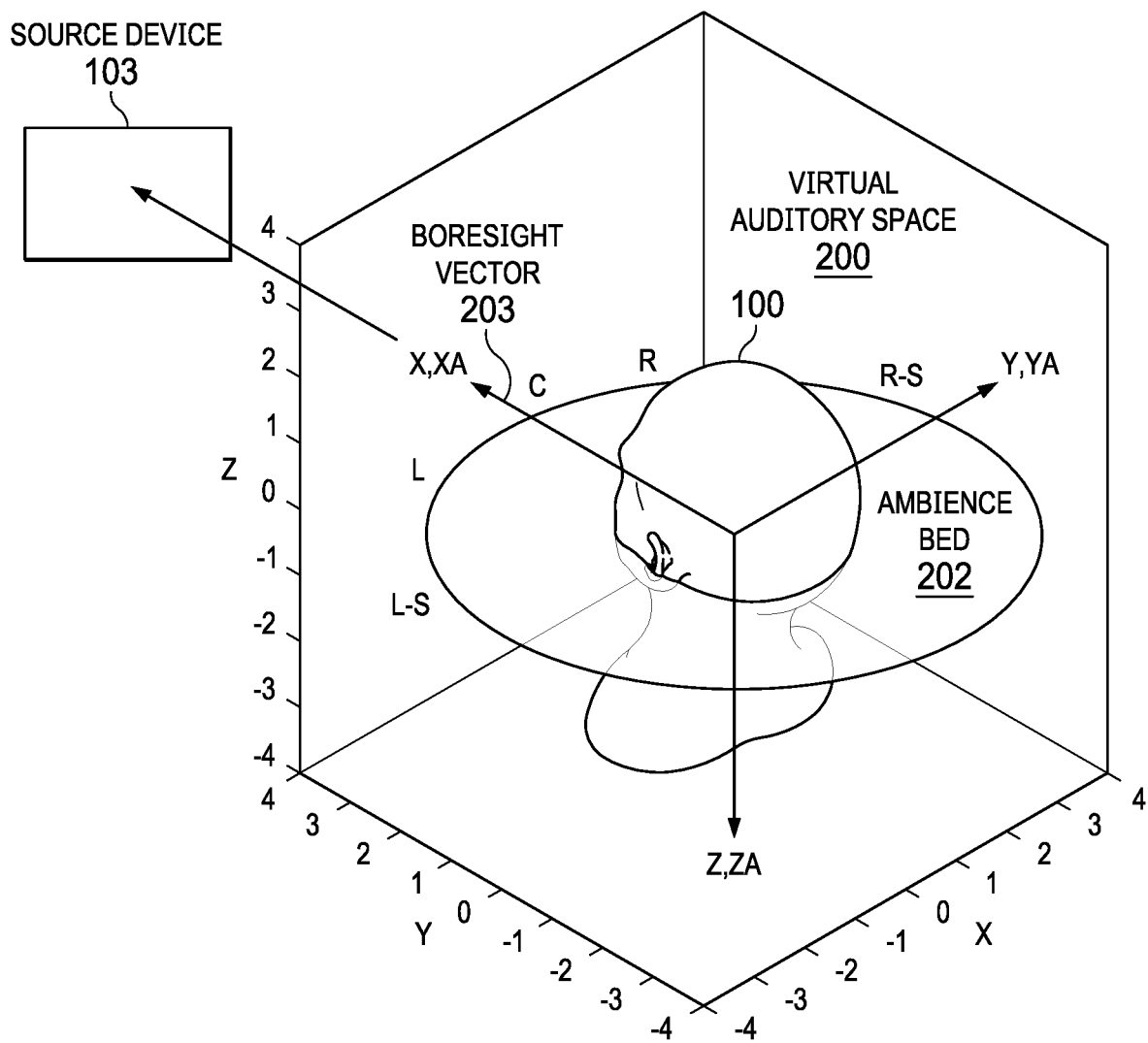
FIG. 2 illustrates a centered and inertially stabilized 3D virtual auditory space, according to an embodiment.

FIG. 2 illustrates a centered and inertially stabilized 3D virtual auditory space 200, according to an embodiment. The virtual auditory space 200 includes virtual sound sources or "virtual speakers" (e.g., center (C), Left (L), Right (R), left-surround (L-S) and right-surround (R-S)) that are rendered in ambience bed 202 using known spatial audio techniques, such as binaural rendering. To maintain the desired 3D spatial audio effect, it is desired that the center channel (C) be aligned with a boresight vector 203. The boresight vector 203 originates from a headset reference frame and terminates at a source device reference frame. When the virtual auditory environment is first initialized, the center channel is aligned with boresight vector 203 by rotating a reference frame for the ambience bed 202 ($X_A, Y_A, Z_A$) to align the center channel with boresight vector 203, as shown in FIG. 2. This alignment process causes the spatial audio to be "centered." When the spatial audio is centered, the user perceives audio from the center channel (e.g., spoken dialogue) as coming directly from the display of source device 103. If the user rotates her head in a face-forward position looking at the display of source device 103, boresight vector 203 does not change and the spatial audio remains centered. If, however, boresight vector 203 changes, e.g., due to the source device and headset reference frames rotating relative to a global reference frame (e.g., the earth under the user's feet), then the spatial audio becomes "uncentered" and the user no longer perceives the center channel audio as coming from the display of source device 103. When this condition is detected, the spatial audio is "re-centered" to the updated boresight 203. In an embodiment, boresight vector 203 is estimated using an extended Kalman filter, as described in Appendix A.

Note that ambience bed 200 shown in FIG. 2 is for a 5.1 audio format, where all audio channels are located in an $X_A$-$Y_A$ plane of ambience bed 202 ($Z_A$=0), where $X_A$ is forward towards the center channel, $Y_A$ is right an $Z_A$ is down. Other embodiments, can have more or fewer audio channels, and the audio channels can be placed at different locations in 3D virtual auditory space, including other planes (other ambience beds) above or below the $X_A$-$Y_A$ plane. In an embodiment, during tracking the $X_A$-$Y_A$ plane of ambience bed 202 is rolled about boresight vector 203 to align with an estimated gravity direction (determined during initialization) in the user's head frame. This ensures that the surround channels are fixed in space and do not tilt up and down as the user rolls her head around.

Figure 3:
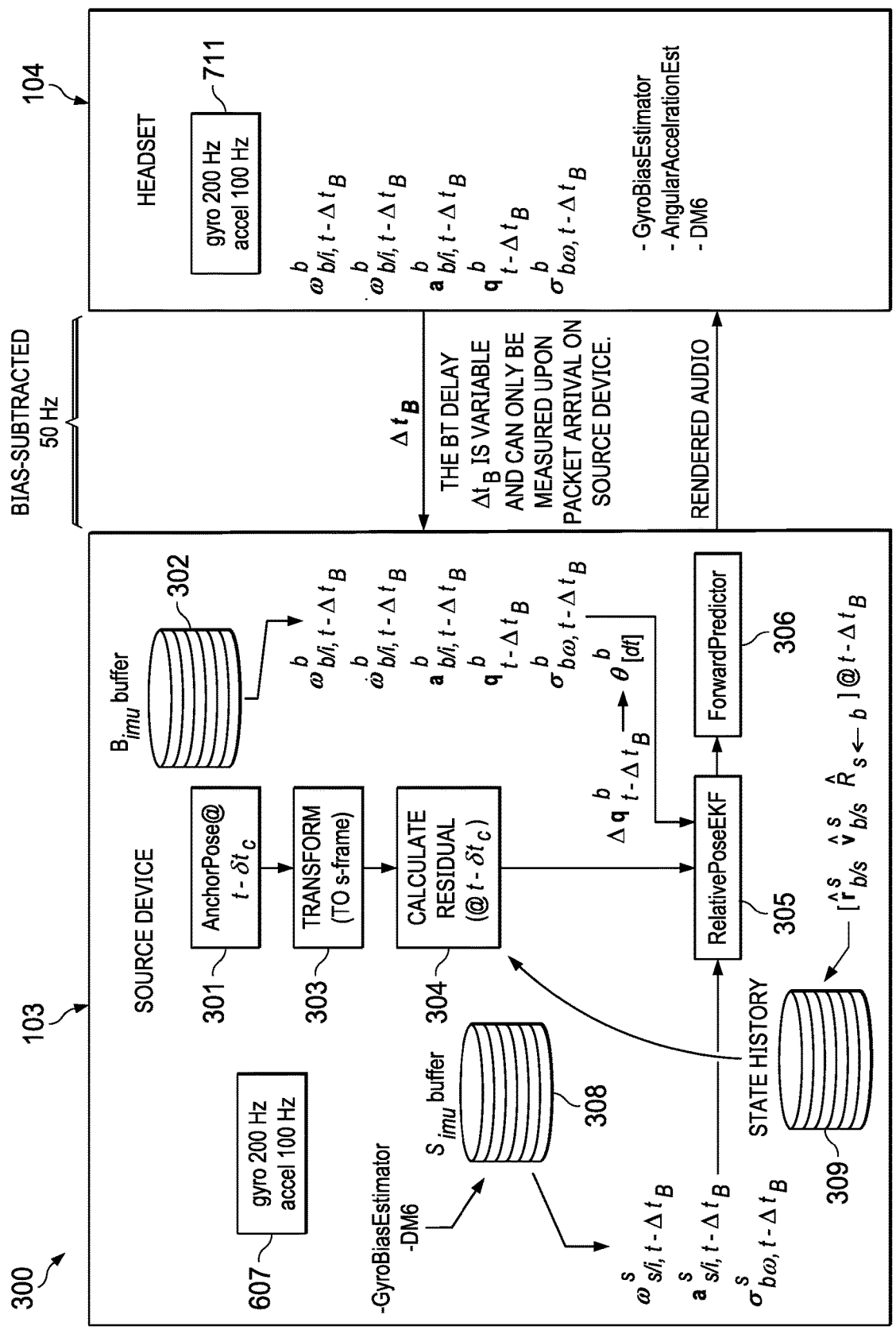
FIG. 3 is a block diagram of a system for tracking the relative motion between a source device and a headset, according to an embodiment.

FIG. 3 is a block diagram of a system 300 for tracking the relative motion between a source device and a headset, according to an embodiment. System 300 includes source device 103 and headset 104 wirelessly coupled to source device 103 using, for example, Bluetooth protocol.

Source device 301 receives headset motion data (e.g., rotation rate, acceleration, attitude) from IMU 711 in headset 104, and stores the headset motion data in buffer 302. Similarly, motion data (e.g., rotation rate, acceleration, attitude) from IMU 607 of source device 103 is stored in buffer 308. In an embodiment, the attitude can be represented as an attitude quaternion, as described in Appendix A. Relative pose extended Kalman filter 305 (RelativePoseEKF 305) estimates relative motion using the headset motion data stored in buffer 302 and the source device motion data stored in buffer 308, as described in Appendix A. The predicted relative motion is updated using anchor pose 301 provided by a face detector that estimates the position and orientation of the user's face in a camera frame captured by a video camera embedded in or coupled to source device 103. The anchor pose 301 is transformed from the camera reference frame into a source device body reference frame so that it can be used to calculate a residual 304 for updating the predicted relative motion, as described in Appendix A. In some embodiments, state history data stored in buffer 309 may also be used in calculating the residual, as described in Appendix A.

In the example shown, a first transmission delay ($\Delta t_B$) incurred when the headset motion data was transferred to source device 103 is determined by a wireless communication stack when a data packet including the motion data arrives at a wireless transceiver of source device 103. The predicted relative motion data (e.g., relative position, relative velocity, attitude) is input into forward predictor 306, which uses kinematic equations to predict the relative position forward in time equal to the total round trip delay, as described in reference to FIG. 4. The round trip delay includes $\Delta t_B$ plus an expected second delay $\Delta T_B$ incurred when the rendered audio is transferred back to headset 104. In an embodiment, other time delays can be included in the prediction, such as the time to decode the packets, access data from buffers 301, 308, 309, etc.

Example Processes

Figure 4:
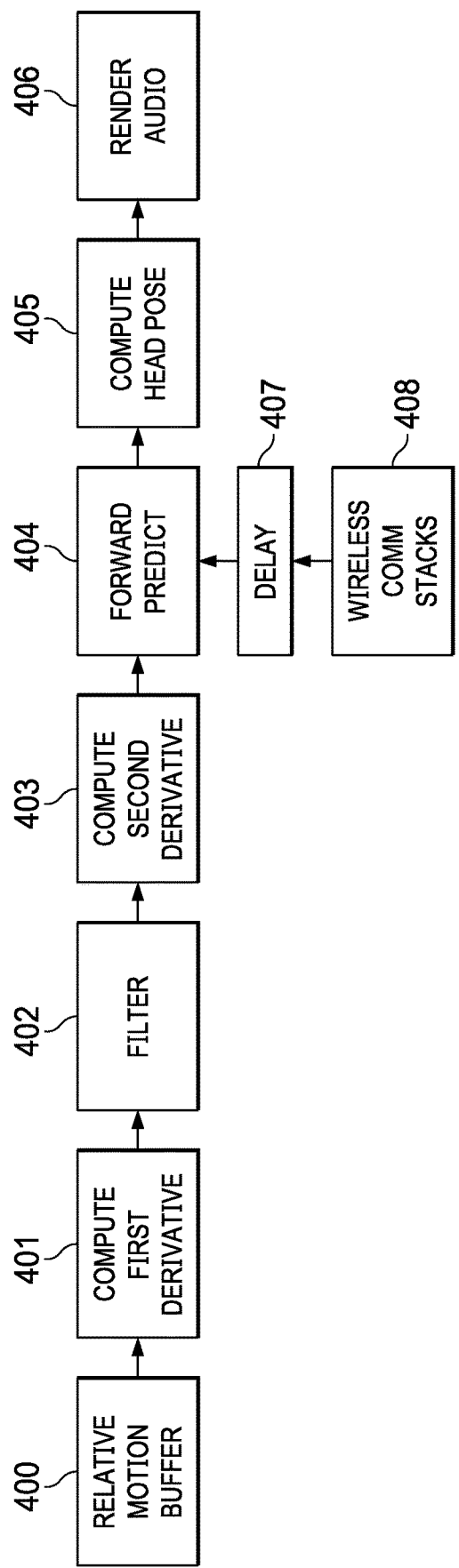
FIG. 4 is a flow diagram of a process of forward predicting relative motion to account for wireless communication delays, according to an embodiment.

FIG. 4 is a flow diagram of process 400 of forward predicting relative motion data to account for communication delay times, according to an embodiment. Process 400 can be implemented using, for example, the source device architecture 600 and headset architecture 700, as described in reference to FIGS. 6 and 7, respectively.

Process 400 begins by computing a first derivative of the relative motion data stored in buffer 400. The relative motion data is output by RelativePoseEKF 305, as previously described. A first derivative (401) is computed on the relative position and rotation to get relative velocity and rotation rate. This can be done by differencing samples of the relative positions and rotations in buffer 400 over a desired time window. The relative velocity and rotation rate are than filtered (402) to remove outlier samples. In the embodiment shown, a median filter is used. Other filters could also be used, such as a mean filter.

Process 400 continues by computing a second derivative (403) on the filtered relative velocity and rotation rate, resulting in relative acceleration and rotational acceleration. The relative position $r_{rel}$ and relative rotation $\theta_{rel}$ are predicted forward using kinematic equations of motion [1] and [2].

$$r_{rel\_t+\Delta t} = r_{rel\_t-\Delta t} + v_{rel}\Delta t + \frac{1}{2}a_{rel}\Delta t^2, \quad [1]$$

$$\theta_{rel\_t+\Delta t} = \theta_{rel\_t-\Delta t} + \dot{\omega}_{rel}\Delta t + \frac{1}{2}\ddot{\omega}_{rel}\Delta t^2, \quad [2]$$

where $\Delta t = t_b + T_b$, $v_{rel}$ is relative velocity, $\alpha_{rel}$ is acceleration, $\dot{\omega}_{rel}$ rotation rate, $\ddot{\omega}_{rel}$ is rotational acceleration and $r_{rel_o}$ and $\theta_{rel_o}$ are the previous relative position and rotation, respectively. Note that Equations [2] could also be computed using quaternion math notation. In an embodiment, a wireless stack on source device 103 and/or headset 104 provide $t_b$ and $T_b$. In an embodiment, $t_b$ is determine when the data packet including the headset motion data arrives at source device 103, and can be determined accurately. $T_b$ can be determined looking at a past history of transfer times stored in memory of source device 103 and/or headset 104.

The predicted relative motion is then input into a head tracker and used to track the user's head pose (405). The head pose is input into a spatial audio rendering engine (e.g., a binaural rendering engine) that renders the spatial audio (406). The rendered spatial audio is then transferred back to headset 104 where it is played back to the user.

Figure 5:
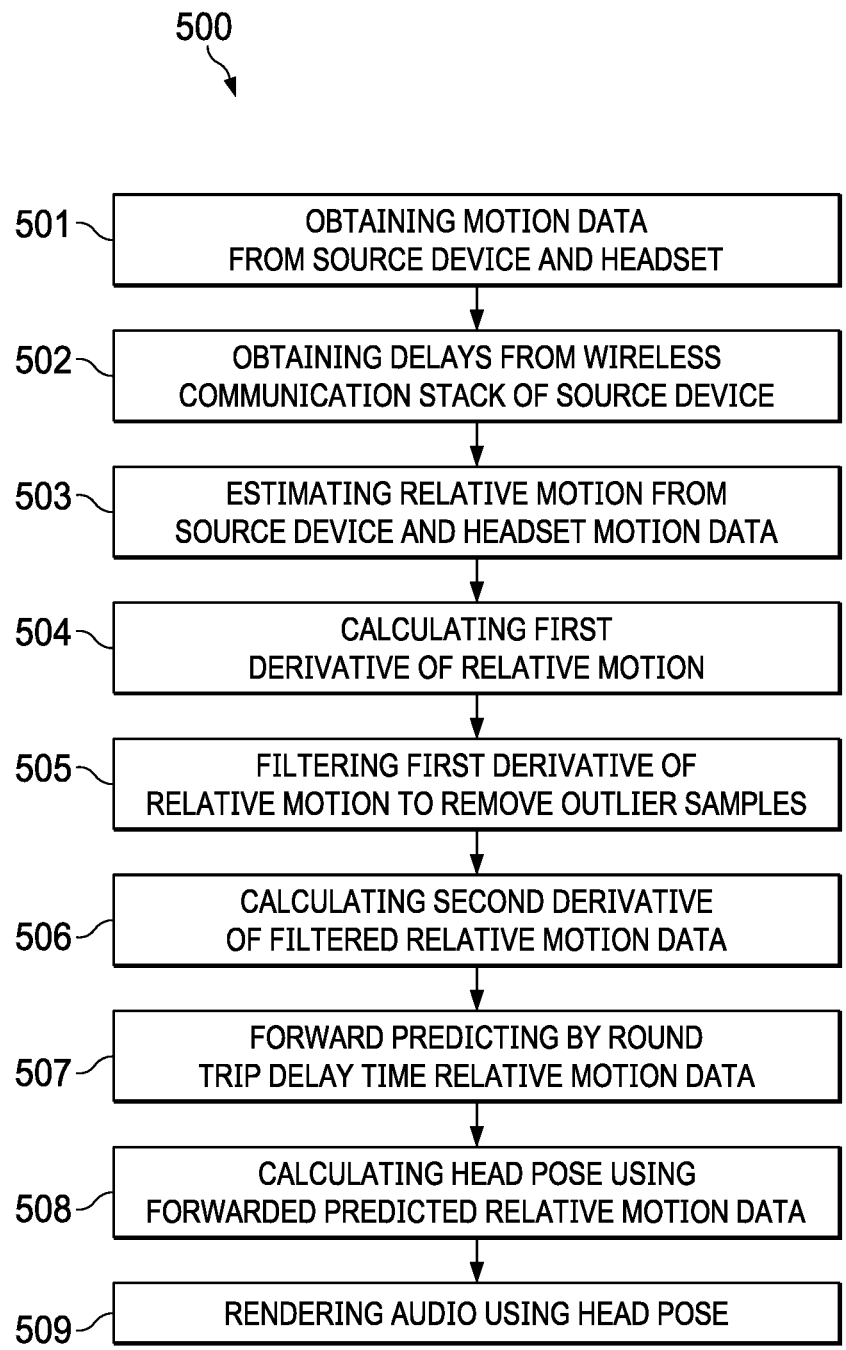
FIG. 5 is a flow diagram of a process of relative motion tracking with forward prediction, according to an embodiment.

FIG. 5 is a flow diagram of process 500 of relative motion tracking with forward prediction, according to an embodiment. Process 500 can be implemented using, for example, the source device architecture 600 and headset architecture 700, as described in reference to FIGS. 6 and 7, respectively.

Process 500 begins obtaining motion data from a source device and a headset (501), and obtaining transmission delays from a wireless stack of the source device (502) for transmissions between the source device and the headset. In an embodiment, a return delay $\Delta T_b$ from the source device to the headset can be measured by a wireless communication stack on the headset and sent back to the source device with the headset motion data. The return delay can be predicted or estimated based a history of return delays (e.g., an average of return time delays) that are accumulated by the headset and/or source device.

Process 500 continues by estimating relative motion (e.g., relative position and rotation) from the relative source device and headset motion data (503). For example, relative motion can be estimated as described in reference to Appendix A.

Process 500 continues by calculating a first derivative of the relative motion (i.e., relative velocity and rotation rate) (504), filtering the first derivative of the relative motion to remove outlier data (505) (e.g., using a median filter), calculating a second derivative of the filtered relative motion (i.e., acceleration and rotational acceleration) (506), and forward predicting by the total round trip delay the estimated relative motion (507) using the first and second derivatives of the relative motion data and the kinematic Equations [1] and [2].

Example Software/Hardware Architectures

Figure 6:
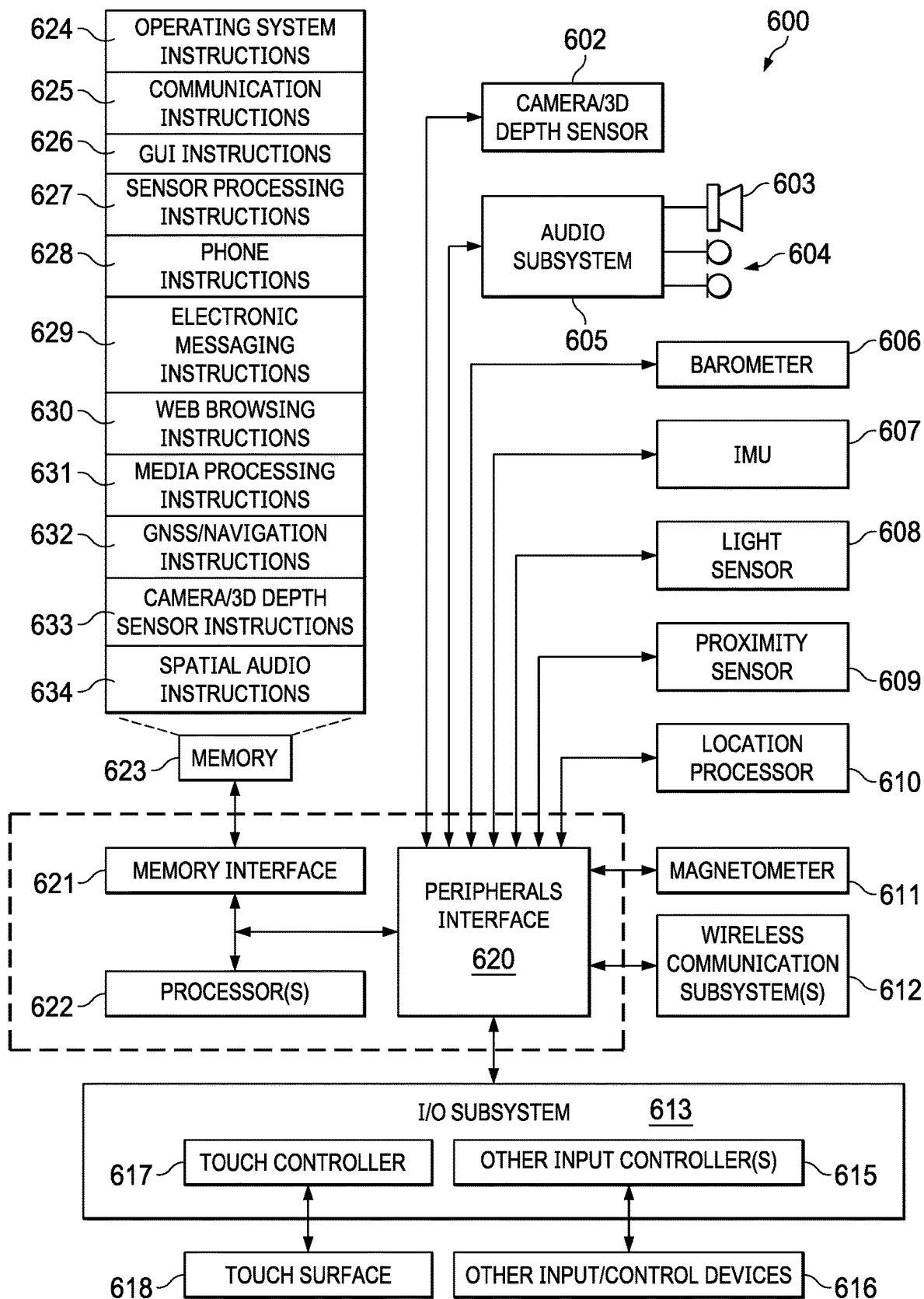
FIG. 6 is a conceptual block diagram of a source device software/hardware architecture implementing the features and operations described in reference to FIGS. 1-5.

FIG. 6 is a conceptual block diagram of source device software/hardware architecture 600 implementing the features and operations described in reference to FIGS. 1-5. Architecture 600 can include memory interface 602, one or more data processors, digital signal processors (DSPs), image processors and/or central processing units (CPUs) 604 and peripherals interface 606. Memory interface 621, one or more processors 622 and/or peripherals interface 620 can be separate components or can be integrated in one or more integrated circuits.

Sensors, devices and subsystems can be coupled to peripherals interface 620 to provide multiple functionalities. For example, IMU 607, light sensor 608 and proximity sensor 609 can be coupled to peripherals interface 620 to facilitate motion sensing (e.g., acceleration, rotation rates), lighting and proximity functions of the wearable computer. Location processor 610 can be connected to peripherals interface 620 to provide geo-positioning. In some implementations, location processor 610 can be a GNSS receiver, such as the Global Positioning System (GPS) receiver. Electronic magnetometer 611 (e.g., an integrated circuit chip) can also be connected to peripherals interface 620 to provide data that can be used to determine the direction of magnetic North. Electronic magnetometer 611 can provide data to an electronic compass application. IMU 607 can include one or more accelerometers and/or gyros (e.g., 3-axis MEMS accelerometer and 3-axis MEMS gyro) configured to determine change of speed and direction of movement of the source device. Barometer 606 can be configured to measure atmospheric pressure around the mobile device.

Camera/3D depth sensor 602 captures digital images and video and can include both forward-facing and rear-facing cameras. The 3D depth sensor can be any sensor capable of capturing 3D data or point clouds, such as a time of flight (TOF) sensor or LiDAR.

Communication functions can be facilitated through wireless communication subsystems 612, which can include radio frequency (RF) receivers and transmitters (or transceivers) and/or optical (e.g., infrared) receivers and transmitters. The specific design and implementation of the wireless communication subsystem 612 can depend on the communication network(s) over which a mobile device is intended to operate. For example, architecture 600 can include communication subsystems 612 designed to operate over a GSM network, a GPRS network, an EDGE network, a Wi-Fi™ network and a Bluetooth™ network. In particular, the wireless communication subsystems 612 can include hosting protocols, such that the mobile device can be configured as a base station for other wireless devices.

Audio subsystem 605 can be coupled to a speaker 603 and one or more microphones 604 to facilitate voice-enabled functions, such as voice recognition, voice replication, digital recording and telephony functions. Audio subsystem 605 can be configured to receive voice commands from the user.

I/O subsystem 613 can include touch surface controller 617 and/or other input controller(s) 615. Touch surface controller 617 can be coupled to a touch surface 618. Touch surface 618 and touch surface controller 617 can, for example, detect contact and movement or break thereof using any of a plurality of touch sensitivity technologies, including but not limited to capacitive, resistive, infrared and surface acoustic wave technologies, as well as other proximity sensor arrays or other elements for determining one or more points of contact with touch surface 646. Touch surface 618 can include, for example, a touch screen or the digital crown of a smart watch. I/O subsystem 613 can include a haptic engine or device for providing haptic feedback (e.g., vibration) in response to commands from processor or a digital signal processor (DSP) 622. In an embodiment, touch surface 618 can be a pressure-sensitive surface.

Other input controller(s) 644 can be coupled to other input/control devices 616, such as one or more buttons, rocker switches, thumb-wheel, infrared port and USB port. The one or more buttons (not shown) can include an up/down button for volume control of speaker 603 and/or microphones 604. Touch surface 618 or other input control devices 616 (e.g., a button) can include, or be coupled to, fingerprint identification circuitry for use with a fingerprint authentication application to authenticate a user based on their fingerprint(s).

In one implementation, a pressing of the button for a first duration may disengage a lock of the touch surface 618; and a pressing of the button for a second duration that is longer than the first duration may turn power to the mobile device on or off. The user may be able to customize a functionality of one or more of the buttons. The touch surface 618 can, for example, also be used to implement virtual or soft buttons.

In some implementations, the mobile device can present recorded audio and/or video files, such as MP3, AAC and MPEG files. In some implementations, the mobile device can include the functionality of an MP3 player. Other input/output and control devices can also be used.

Memory interface 621 can be coupled to memory 623. Memory 623 can include high-speed random access memory and/or non-volatile memory, such as one or more magnetic disk storage devices, one or more optical storage devices and/or flash memory (e.g., NAND, NOR). Memory 623 can store operating system 624, such as the iOS operating system developed by Apple Inc. of Cupertino, Calif. Operating system 624 may include instructions for handling basic system services and for performing hardware dependent tasks. In some implementations, operating system 624 can include a kernel (e.g., UNIX kernel).

Memory 623 may also store communication instructions 625 to facilitate communicating with one or more additional devices, one or more computers and/or one or more servers, such as, for example, instructions for implementing a software stack for wired or wireless communications with other devices. Memory 623 may include graphical user interface instructions 626 to facilitate graphic user interface processing; sensor processing instructions 627 to facilitate sensor-related processing and functions; phone instructions 628 to facilitate phone-related processes and functions; electronic messaging instructions 629 to facilitate electronic-messaging related processes and functions; web browsing instructions 630 to facilitate web browsing-related processes and functions; media processing instructions 631 to facilitate media processing-related processes and functions; GNSS/Location instructions 632 to facilitate generic GNSS and location-related processes; and camera/3D depth sensor instructions 633 for capturing images (e.g., video, still images) and depth data (e.g., a point cloud). Memory 623 further includes instructions 634 for use in spatial audio applications, including but not limited AR and immersive video applications, and for performing the processes described in reference to FIGS. 1-5

Each of the above identified instructions and applications can correspond to a set of instructions for performing one or more functions described above. These instructions need not be implemented as separate software programs, procedures, or modules. Memory 623 can include additional instructions or fewer instructions. Furthermore, various functions of the mobile device may be implemented in hardware and/or in software, including in one or more signal processing and/or application specific integrated circuits.

Figure 7:
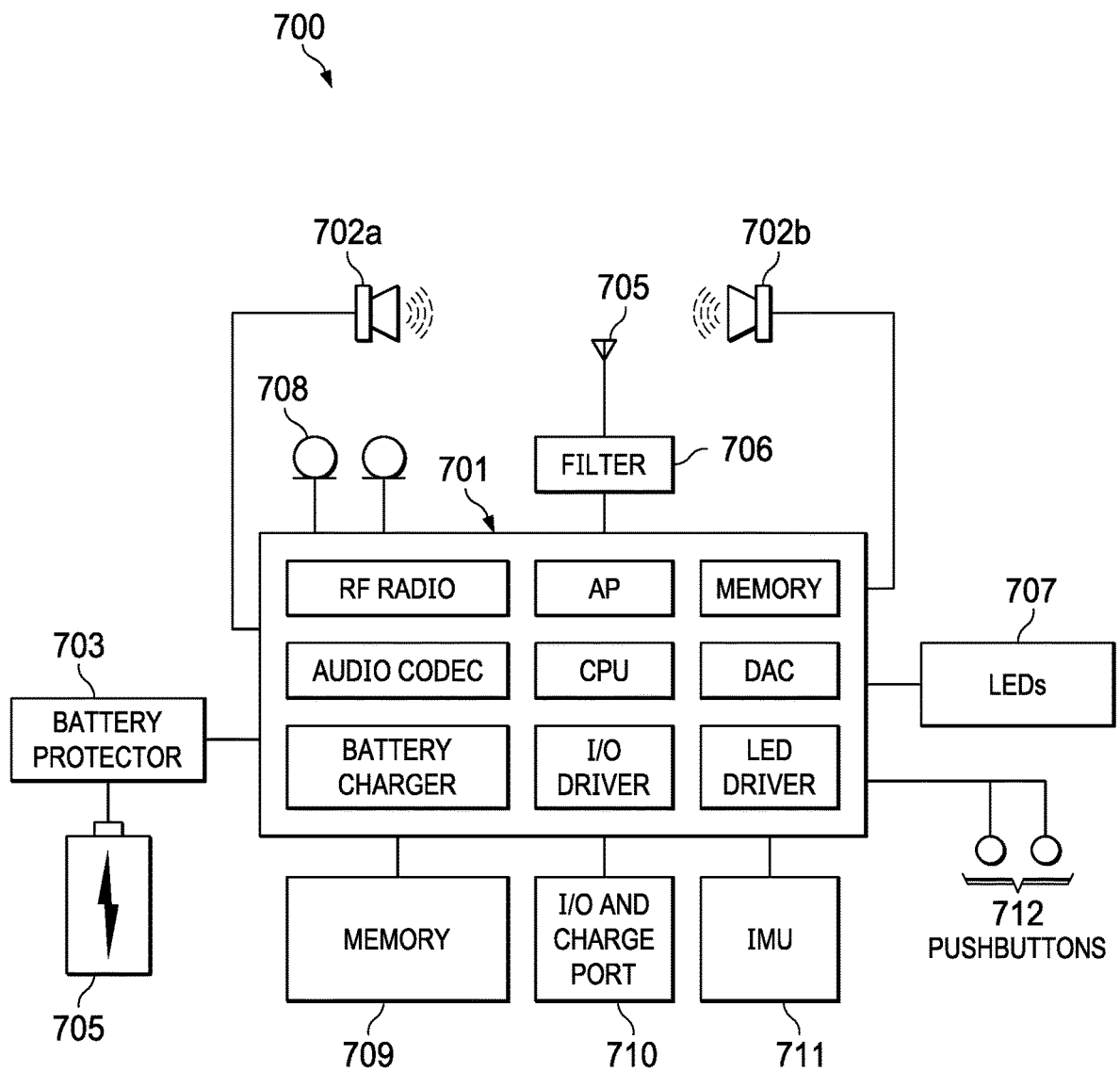
FIG. 7 is a conceptual block diagram of a headset software/hardware architecture implementing the features and operations described in reference to FIGS. 1-5.

FIG. 7 is a conceptual block diagram of headset software/hardware architecture 700 implementing the features and operations described in reference to FIGS. 1-5. In an embodiment, architecture 700 can includes system-on-chip (SoC) 701, stereo loudspeakers 702a, 702b (e.g., ear buds, headphones, ear phones), battery protector 703, rechargeable battery 704, antenna 705, filter 706, LEDs 707, microphones 708, memory 709 (e.g., flash memory), I/O/Charge port 710, IMU 711 and pushbuttons 712 for turning the headset on and off, adjusting volume, muting, etc. IMU 711 was previously described in reference to FIGS. 1-5, and includes, for example, a 3-axis MEMS gyro and a 3-axis MEMS accelerometer.

SoC 701 further includes various modules, such as a radio frequency (RF) radio (wireless transceiver) for wireless bi-directional communication with other devices, such as a source device 103, as described in reference to FIGS. 1-5. SoC 701 further includes an application processor (AP) for running specific applications, memory (e.g., flash memory), central processing unit (CPU) for managing various functions of the headsets, audio codec for encoding/decoding audio, battery charger for charging/recharging rechargeable battery 704, I/O driver for driving I/O and charge port (e.g., a micro USB port), digital to analog converter (DAC) converting digital audio into analog audio and LED driver for driving LEDs 707. Other embodiments can have more or fewer components.

Figure 8:
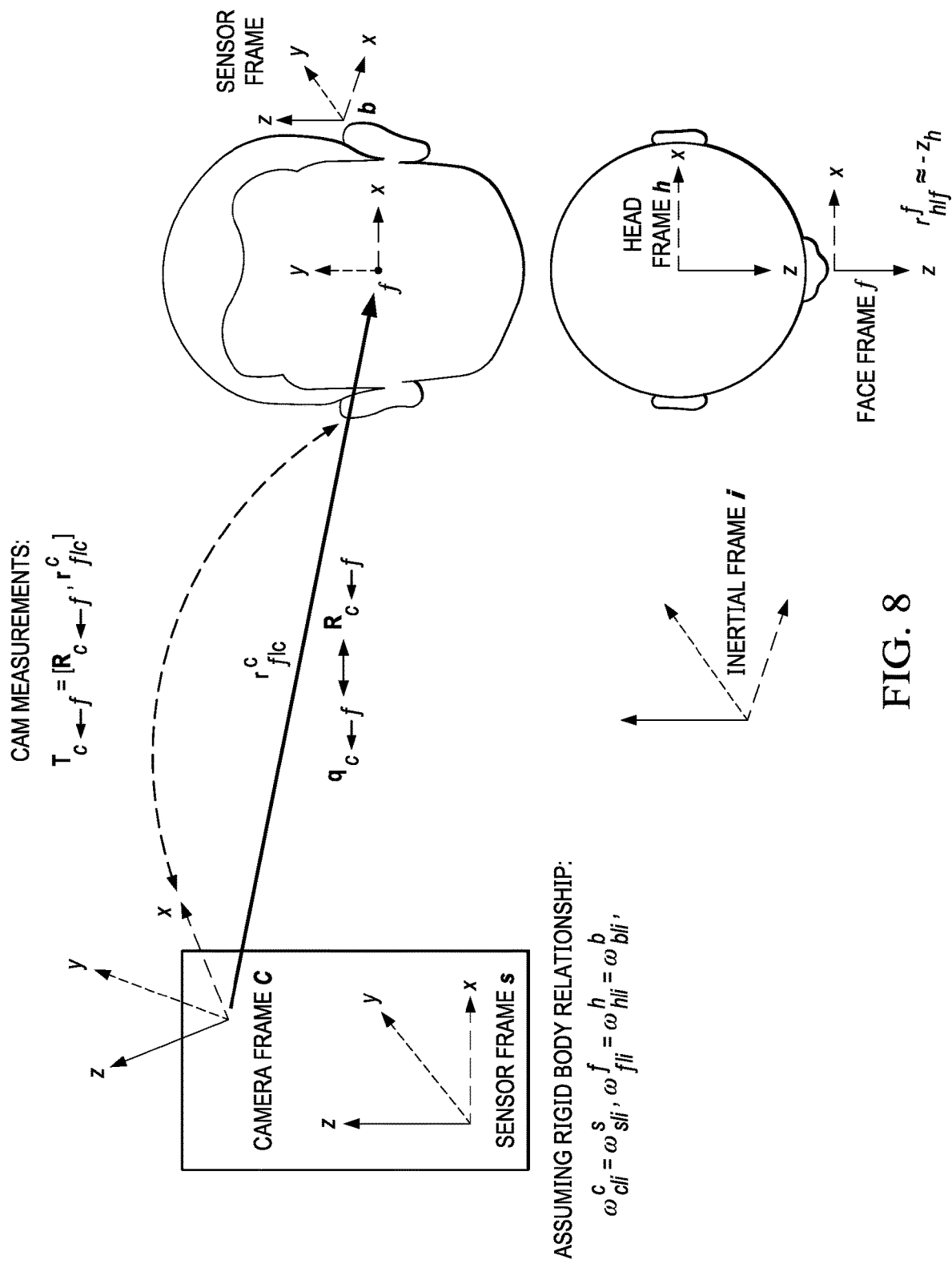
FIG. 8 illustrates various reference frames and notation for relative pose tracking, according to an embodiment.

FIG. 8 illustrates various reference frames and notation for relative pose tracking, according to an embodiment, as described more fully in Appendix A attached hereto.

Figure 9:
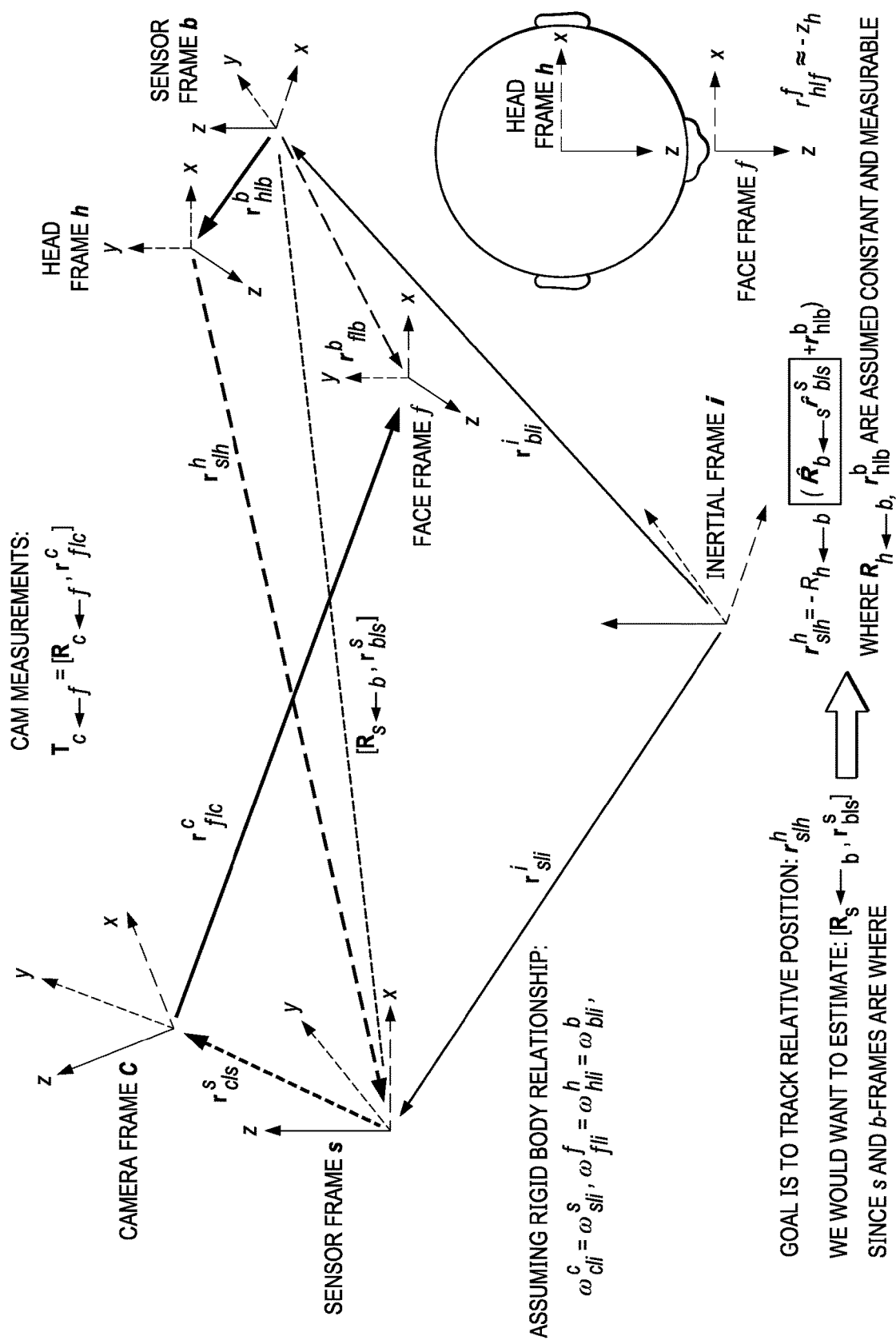
FIG. 9 illustrates the geometry for a relative motion model used in headtracking, according to an embodiment.

FIG. 9 illustrates the geometry for a relative motion model used in headtracking, according to an embodiment, as described more fully in Appendix A attached hereto.

The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language (e.g., SWIFT, Objective-C, C #, Java), including compiled or interpreted languages, and it can be deployed in any form, including as a stand-alone program or as a module, component, subroutine, a browser-based web application, or other unit suitable for use in a computing environment.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable sub combination. Moreover, although features may be described above as acting in certain combinations and even initially claimed as such, one or more features from a claimed combination can in some cases be excised from the combination, and the claimed combination may be directed to a sub combination or variation of a sub combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

As described above, some aspects of the subject matter of this specification include gathering and use of data available from various sources to improve services a mobile device can provide to a user. The present disclosure contemplates that in some instances, this gathered data may identify a particular location or an address based on device usage. Such personal information data can include location-based data, addresses, subscriber account identifiers, or other identifying information.

The present disclosure further contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. For example, personal information from users should be collected for legitimate and reasonable uses of the entity and not shared or sold outside of those legitimate uses. Further, such collection should occur only after receiving the informed consent of the users. Additionally, such entities would take any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices.

In the case of advertisement delivery services, the present disclosure also contemplates embodiments in which users selectively block the use of, or access to, personal information data. That is, the present disclosure contemplates that hardware and/or software elements can be provided to prevent or block access to such personal information data. For example, in the case of advertisement delivery services, the present technology can be configured to allow users to select to "opt in" or "opt out" of participation in the collection of personal information data during registration for services.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences based on non-personal information data or a bare minimum amount of personal information, such as the content being requested by the device associated with a user, other non-personal information available to the content delivery services, or publicly available information.

What is claimed is:

1. A method comprising:
obtaining, using one or more processors, motion data from a source device and a headset;
obtaining, using the one or more processors, transmission delays from a wireless stack of the source;
estimating, using the one or more processors, relative motion from the relative source device and headset motion data;
calculating, using the one or more processors, a first derivative of the relative motion data;
calculating, using the one or more processors, a second derivative of the filtered relative motion data;
forward predicting, using the one or more processors, the estimated relative motion over the time delays using the first derivative and second derivative of relative motion;
determining, using a head tracker, a head pose of a user based on the forward predicted relative motion data; and
rendering, using the one or more processors and the head pose, spatial audio for playback on the headset.

2. The method of claim 1, wherein rendering, using the one or more processors and the head pose, spatial audio for playback on the headset comprises:
rendering audio channels in an ambience bed of a three-dimensional virtual auditory space, such that a center channel of the audio channels is aligned with a boresight vector that originates from a headset reference frame and terminates at a source device reference frame, wherein the center channel is aligned with boresight vector by rotating a reference frame for the ambience bed to align the center channel with boresight vector, and wherein the boresight indicates a relative position between the source device and the headset.

3. The method of claim 1, wherein the motion data is obtained over a Bluetooth™ communication channel between the headset and the source device.

4. The method of claim 1, wherein the source device is a mobile device are configured to present visual content synchronized with spatial audio played through the headset.

5. The method of claim 1, wherein the time delays includes a return delay from the source device to the headset that is measured by a wireless communication stack on the headset and sent back to the source device with the headset motion data.

6. The method of claim 5, wherein time delays include a first time delay to decode packets carrying the motion data and a second time delay to access and read buffers storing the motion data.

7. The method of claim 5, wherein the return delay is predicted or estimated based on an average of return time delays that are accumulated by at least one of the headset or the source device.

8. The method of claim 1, further comprising:
filtering, using the one or more processors, the first derivative of the relative motion data to remove outlier data.

9. The method of claim 1, wherein the filtering includes filtering using a median filter.

10. The method of claim 1, wherein the motion data includes relative position data and rotation data, the first derivative of the relative position is relative velocity, the first derivative of the rotation data is rotation rate, the second derivative of relative velocity is relative acceleration and the second derivative of rotation rate is rotational acceleration.

11. A system comprising:
one or more processors;
memory storing instructions that when executed by the one or more processors, cause the one or more processors to perform operations comprising:
obtaining motion data from a source device and a headset;
obtaining transmission delays from a wireless stack of the source;
estimating relative motion from the relative source device and headset motion data;
calculating a first derivative of the relative motion data;
calculating a second derivative of the filtered relative motion data;
forward predicting the estimated relative motion over the time delays using the first derivative and second derivative of relative motion;
determining, using a head tracker, a head pose of a user based on the forward predicted relative motion data; and
rendering, using the head pose, spatial audio for playback on the headset.

12. The system of claim 11, wherein rendering, using the one or more processors and the head pose, spatial audio for playback on the headset comprises:
rendering audio channels in an ambience bed of a three-dimensional virtual auditory space, such that a center channel of the audio channels is aligned with a boresight vector that originates from a headset reference frame and terminates at a source device reference frame, wherein the center channel is aligned with boresight vector by rotating a reference frame for the ambience bed to align the center channel with boresight vector, and wherein the boresight indicates a relative position between the source device and the headset.

13. The system of claim 11, wherein the motion data is obtained over a Bluetooth™ communication channel between the headset and the source device.

14. The system of claim 11, wherein the source device is a mobile device are configured to present visual content synchronized with spatial audio played through the headset.

15. The system of claim 11, wherein the time delays includes a return delay from the source device to the headset that is measured by a wireless communication stack on the headset and sent back to the source device with the headset motion data.

16. The system of claim 15, wherein time delays include a first time delay to decode packets carrying the motion data and a second time delay to access and read buffers storing the motion data.

17. The system of claim 15, wherein the return delay is predicted or estimated based on an average of return time delays that are accumulated by at least one of the headset or the source device.

18. The system of claim 11, further comprising:
filtering, using the one or more processors, the first derivative of the relative motion data to remove outlier data.

19. The system of claim 18, wherein the filtering includes filtering using a median filter.

20. The system of claim 11, wherein the motion data includes relative position data and rotation data, the first derivative of the relative position is relative velocity, the first derivative of the rotation data is rotation rate, the second derivative of relative velocity is relative acceleration and the second derivative of rotation rate is rotational acceleration.

\* \* \* \* \*